(12) United States Patent
Xie et al.

(10) Patent No.: US 9,571,960 B2
(45) Date of Patent: Feb. 14, 2017

(54) PERSONALIZED METHOD FOR ENHANCING SERVICE, NETWORK SIDE DEVICE, AND MOBILE USER EQUIPMENT

(71) Applicant: ZTE CORPORATION, Shenzhen, Guangdong Province (CN)

(72) Inventors: Feng Xie, Shenzhen (CN); Ying Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/408,979

(22) PCT Filed: Aug. 1, 2013

(86) PCT No.: PCT/CN2013/080618
§ 371 (c)(1),
(2) Date: Dec. 18, 2014

(87) PCT Pub. No.: WO2014/026548
PCT Pub. Date: Feb. 20, 2014

(65) Prior Publication Data
US 2015/0181373 A1    Jun. 25, 2015

(30) Foreign Application Priority Data
Aug. 15, 2012 (CN) .......................... 2012 1 0290205

(51) Int. Cl.
*H04W 24/00* (2009.01)
*H04W 4/02* (2009.01)
*H04M 15/00* (2006.01)

(52) U.S. Cl.
CPC ........... *H04W 4/02* (2013.01); *H04M 15/8033* (2013.01); *H04W 4/021* (2013.01)

(58) Field of Classification Search
CPC ........... H04W 64/00; H04W 4/24; H04W 4/02
(Continued)

(56) References Cited

U.S. PATENT DOCUMENTS

| 7,576,691 B2 * | 8/2009 | Trautenberg ............ G01S 19/20 342/357.45 |
| 2003/0187980 A1 * | 10/2003 | Sakata .................... H04W 4/02 709/224 |

(Continued)

FOREIGN PATENT DOCUMENTS

| CN | 101523959 A | 9/2009 |
| CN | 102007799 A | 4/2011 |

*Primary Examiner* — Danh Le
(74) *Attorney, Agent, or Firm* — Ling Wu; Stephen Yang; Ling and Yang Intellectual Property (57) ABSTRACT

A personalized method for enhancing a service, a network side device and a mobile user equipment are provided. The network side device provides an enhanced service for a user equipment located at a service location preset by a user. The network side device comprises a service location determination module and an enhanced service control module. The service location determination module is configured to maintain the service location preset by the user. The enhanced service control module is configured to indicate to provide the enhanced service for the user equipment located at the service location preset by the user. The mobile user equipment comprises an enhanced service indication module. The enhanced service indication module is configured to send a user indication to the network side device to enable the network side device to provide the enhanced service for the user equipment located at the service location preset by the user.

8 Claims, 5 Drawing Sheets

(58) Field of Classification Search
USPC ............... 455/456.5, 406, 550.1; 709/224
See application file for complete search history.

(56) References Cited

U.S. PATENT DOCUMENTS

| | | |
|---|---|---|
| 2005/0153706 A1 | 7/2005 | Niemenmaa et al. |
| 2007/0281669 A1* | 12/2007 | Jiang ................... H04M 3/44 455/414.1 |
| 2007/0293216 A1* | 12/2007 | Jiang ................... H04W 4/12 455/433 |
| 2008/0207181 A1* | 8/2008 | Jiang ................... H04W 4/14 455/414.1 |
| 2009/0067328 A1* | 3/2009 | Morris ............. H04W 72/1242 370/230.1 |
| 2009/0304055 A1* | 12/2009 | Nino .................. H04W 24/02 375/222 |
| 2011/0070863 A1 | 3/2011 | Ma et al. |
| 2011/0173659 A1* | 7/2011 | Lafreniere ......... H04N 5/44543 725/40 |
| 2011/0179125 A1* | 7/2011 | Lee ..................... G06Q 10/00 709/206 |
| 2011/0212735 A1 | 9/2011 | Buer et al. |
| 2012/0072536 A1* | 3/2012 | Xu ..................... A61B 5/0015 709/217 |
| 2013/0183946 A1* | 7/2013 | Jeong ................... H04W 4/16 455/414.1 |
| 2014/0080458 A1* | 3/2014 | Bonner ................. H04W 4/16 455/414.1 |

\* cited by examiner

PERSONALIZED METHOD FOR ENHANCING SERVICE, NETWORK SIDE DEVICE, AND MOBILE USER EQUIPMENT

TECHNICAL FIELD

The present document relates to the wireless communication technology field, and in particular, to a personalized method for enhancing a service and a network side device and a mobile user equipment.

BACKGROUND OF THE RELATED ART

In a wireless cellular communication system, the base station is a device providing the wireless access for the user equipment (UE, which also can be called a user equipment terminal), and the base station performs the wireless communication with the user equipment through the electromagnetic wave. A base station may include one or more serving cells, and the wireless communication system can provide the wireless coverage for the user equipment within a certain geographical range through the serving cell.

In order to be able to provide a wide-range wireless communication for the user, the wireless communication system needs to deploy a base station with a great coverage range, and this kind of base station is usually called a macro base station (Macro eNB or Macro BS), and its serving cell is usually called a Macro Cell. In addition, in consideration of different demands and different using environments of the users, the wireless communication system needs to provide wireless communication service with higher quality for the user under some environments or scenes, so some small-scale base stations with small coverage range and lower transmission power are adopted. These small-scale base stations include Pico base stations (Pico eNB or Pico BS) and Femto base stations (Femto eNB or Femto BS), wherein, the Femto base station also can be called a home base station (HNB or HeNB), a femto base station or a flying base station, and a cell provided by the Pico base station and the home base station is called a pico cell or a femtocell. And a cell provided by a small-scale base station or a low-power node (LPN) also can be called a small cell.

How to optimize the quality and the service mode of the personalized service provided for the user is a problem that has been studied constantly all the time.

SUMMARY

The technical problem required to be solved by the embodiment of the present document is to provide a personalized method for enhancing a service and a network side device and a mobile user equipment, to provide a new scheme for the personalized enhanced service.

In order to solve the above-mentioned technical problem, the following technical scheme is adopted.

A personalized method for enhancing a service comprises:

a network side device providing an enhanced service for a user equipment located at a service location preset by a user.

Alternatively, the method further comprises:

before the step of a network side device providing an enhanced service for a user equipment located at a service location preset by a user, the network side device receiving a user indication carrying information of the service location.

Alternatively, the user indication carries an enhanced service type for the user equipment; and the step of a network side device providing an enhanced service for a user equipment located at a service location comprises: the network device providing an enhanced service corresponding to the enhanced service type for the user equipment.

Alternatively, the user indication carries information of the service location preset by the user and an enhanced service type preset by the user; and the step of a network side device providing an enhanced service for a user equipment located at a service location comprises: the network device providing an enhanced service corresponding to the enhanced service type for the user equipment located at the service location according to the user indication.

Alternatively, the user indication is an indication which is received by the network side device, sent by the user equipment, and associated with a user identification and/or a user equipment identification.

Alternatively, the method further comprises:

before the step of a network side device providing an enhanced service for a user equipment located at a service location preset by a user, the network side device taking a location where the user equipment is located when sending out the user indication as the service location preset by the user.

Alternatively, the user indication comprises information used for identifying the service location, comprising at least one of the following information: a serial number, an index, an identification, a type and a name.

Alternatively, the service location is a geographic location; or, the service location is an access point, an access point set, a cell, a cell set, a tracking area and/or a location area which has a corresponding relation with the geographic location; wherein, the access point comprises: a base station, a transmission point, a receiving point, a transmitting antenna and/or a receiving antenna.

Alternatively, the enhanced service comprises one or more of the following services:

a service for improving a communication rate, a service for enhancing power saving, a service for improving a service quality, a service for expanding a coverage area, a service for reducing an access and/or handover time delay, a service for improving an access and/or handover success rate, a service for reducing overhead, a location-based charging service, and a local business service.

Alternatively, the method further comprises:

before the step of a network side device providing an enhanced service for a user equipment located at a service location preset by a user, the user equipment indicating an option of the service location through an interface, and taking a service location selected by the user as the service location preset by the user.

A network side device comprises a service location determination module and an enhanced service control module; wherein, the service location determination module is configured to: maintain a service location preset by a user; and the enhanced service control module is configured to indicate to provide an enhanced service for a user equipment located at a service location preset by a user.

Alternatively, the network side device further comprises a receiving module, wherein:

the receiving module is configured to: receive a user indication; and the enhanced service control module is further configured to: after the receive module receives the user indication, provide the enhanced service for the user equipment located at the service location preset by the user.

Alternatively, the receiving module is further configured to: when the received user indication carries information of the service location preset by the user, notify the information of the service location to the service location determination module;

when the received user indication carries an enhanced service type of the user equipment preset by the user, notify the enhanced service type to the enhanced service control module;

the service location determination module is further configured to: determine the service location learnt from the receiving module as the service location preset by the user; and the enhanced service control module is further configured to: determine the enhanced service type learnt from the receiving module as a service type of the enhanced service provided for the user equipment.

Alternatively, the enhanced service control module is further configured to:

take a location where the user equipment is located when sending out the user indication as the service location.

A mobile user equipment comprises an enhanced service indication module, wherein:

the enhanced service indication module is configured to: send a user indication to a network side device to enable the network side device to provide an enhanced service for a user equipment located at a service location preset by a user.

Alternatively, the enhanced service indication module is further configured to:

send a user indication to the network side device, and carry the service location and/or a type of the enhanced service in the user indication.

Alternatively, the service location is a geographic location; or, the service location is an access point, an access point set, a cell, a cell set, a tracking area and/or a location area which has a corresponding relation with the geographic location; wherein, the access point comprises: a base station, a transmission point, a receiving point, a transmitting antenna and/or a receiving antenna.

Alternatively, the enhanced service comprises one or more of the following services:

a service for improving a communication rate, a service for enhancing power saving, a service for improving a service quality, a service for expanding a coverage area, a service for reducing an access and/or handover time delay, a service for improving an access and/or handover success rate, a service for reducing overhead, a location-based charging service, and a local business service.

The above-mentioned technical scheme can provide the new scheme for the personalized enhanced service, to improve the user experience.

PREFERRED EMBODIMENTS OF THE INVENTION

The present scheme is mainly explained by taking the LTE (including the TDD-LTE and the FDD-LTE) as an example, and the present scheme can be applied to various mobile cellular communication systems, such as, the 2G (GSM, CDMA) system, the 3G (UMTS, CDMA-2000, Wimax) system (wherein, the UMTS further includes the WCDMA and the TD-SCDMA), the 4G (LTE/LTE-A, Wimax2.0) system, and even the mobile cellular communication system appearing subsequently.

Figure 1:
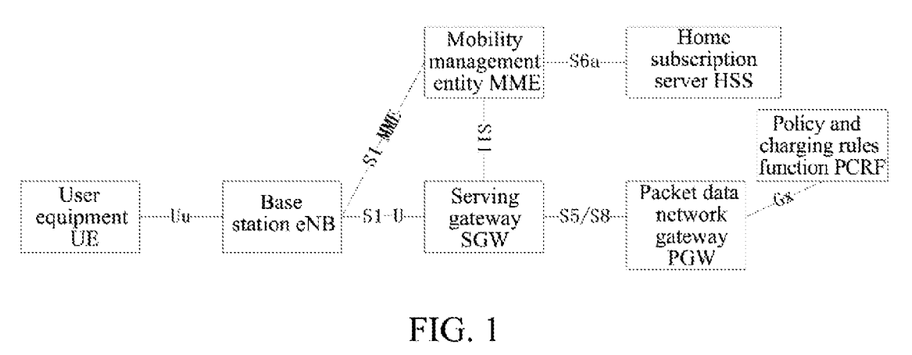
FIG. 1 is a structure diagram of an LTE network.

FIG. 1 is a structure diagram of the LTE wireless communication system, including a user equipment (UE), a base station (eNB), a services gateway (SGW), a packet data network gateway (PGW), a mobility management entity (MME), a home subscription server (HSS) and a policy and charging rules function (PCRF). The interfaces between them include: a Uu interface between the UE and the eNB, an S1-MME interface between the eNB and the MME, an S1-U interface between the eNB and the SGW, an S5/S8 interface between the SGW and the PGW, an S6a interface between the MME and the HSS, and a Gx interface between the PGW and the PCRF.

From a viewpoint of the user, although the users may stay in a lot of locations (such as the cell), nearly all users will have the following phenomena:

1. at certain locations (certain cells), the staying time of the user (for example, the time in the idle state or the time in the connection state and the idle state) is the longest, and even the user stays in these several locations (cells) for most of the time in a regular period (such as, one day, one week, one month, one quarter, one year); for example, the user may stay in the office location or home for most of the time.

2. the service time (or the time in the connection state) when the user is in certain locations (certain cells) is the longest, and even the user stays in these several locations for most of the time in a regular period.

3. the time for providing the particular type of service in certain locations (such as, the conversation service, the data service) for the user is the longest, and the user stays in these several locations (cells) for most of the time for receiving the particular type of service in a regular period.

4. the service traffic of the user is the maximum in certain locations, and even most of the service traffics of the user in a regular period are in these several locations (cells).

5. the service traffic of the particular type obtained by the user in certain locations (such as, the conversation service, the data service) is the maximum, and even most of the service traffics of the particular types of the user in a regular period are at these several locations (cells).

6. the number of times for the user to initiate the services (including that the user equipment initiates the Mobile originated service and/or the user equipment terminates the mobile terminated service) at certain locations is the maximum, and even most of the services initiated by the user in a regular period are in these several locations (cells).

7. the number of times for the user to initiate the services of particular types at certain locations is the maximum, and even most of the particular types of services initiated by the user in a regular period are in these several locations (cells).

It can be summarized from the above-mentioned phenomenon that the experience obtained by the user at some locations (for example, distinguished by cell) may be the main part of the user experience; in other words, the services provided for the user in some locations by the operator have a greatest influence on the user experience. Naturally, the user has a higher expectation for the services obtained at these locations than for the services obtained at other locations as well; for example, the user may endure the coverage hole and the drop-call at a seldom visited location easily, but it is very difficult to endure the coverage hole and the drop-call at a frequently-staying location; and for example, the user may hope that there is a special charging rule when accessing the network at a frequently-visiting location. The location (cell) influencing the user experience greatest can be called an agglutinant location (agglutinant cell). Specifically, the agglutinant location (cell) is generally a location (cell) which the user frequently uses or mainly uses, or a location (cell) of special significance for the user, such as, the home, the office location. Because the agglutinant location is User-specific or UE-specific, or even user-defined, the agglutinant location in the present text is also called the service location or personalized location or the user personalized location.

The system is able to provide the user with the enhanced service at the agglutinant location or the enhanced service based on the personalized location (the user-specific location, the UE-specific location) (also can be called the personalized service, because the present text mainly focus on the user access service, it also can be called the personalized access service in most of situations, while because of the particular location characteristic of the personalized access service, the personalized access service can be coupled with the Location-based service and coupled with the local business based on the local IP access (LIPA); in other words, it can, based on the personalized access service, provide the Location-based service and the LIPA service, thus extending the category of the personalized service); for example, when the user accesses the wireless communication network at home and the office, the system provides the enhanced function and configuration for the user, so that the QoS is higher, and/or the power consumption is less (the battery life is longer), and/or the access/time delay is shorter, and/or the access/handover success rate is higher (or the priority is higher), and/or the location-based charging (for example, a monthly payment based on the personalized location to make the service more cost-effective), and/or providing the service based on location (such as, the content pushing), etc.; but purely from the perspective of the network side, it is difficult to accurately know at which locations that the user has the demand for the enhanced service, and moreover, such a location may be changed with the change of the user behavior rule; for example, under the situation that the user moves, changes the work, goes on business or travels, the user possibly generates the demand for the enhanced service in some locations which are not used or seldom used originally, and the locations which are frequently used originally become seldom used, and then the original enhanced service is not required any more (in fact, here it can be divided into a long-term demand change and a temporary demand change; for such a demand change, the network side is unable to know in time through the statistical method, so it needs to bind the user and the location (adding the enhanced service based on the personalized location) or modifying/deleting the binding by the way of a user indication.

The network side is not only difficult to know at which locations that the user has the demand for the enhanced service, but it is also very difficult for the network side to know accurately what kind of enhanced service demand the user has; for example, whether it is a power saving enhancement, or QoS enhancement, or improving the access/handover success rate, or special charging, etc., or the combination of them, and if the network side provides same enhanced services for all users, it may cause the mismatch with the actual demand of the user, and finally result in wasting the network resources. Therefore, a better method is to allow the user to define enhanced services as needed by oneself, and even allow the user to define different enhanced services for different locations (and different time intervals in addition).

Figure 2:
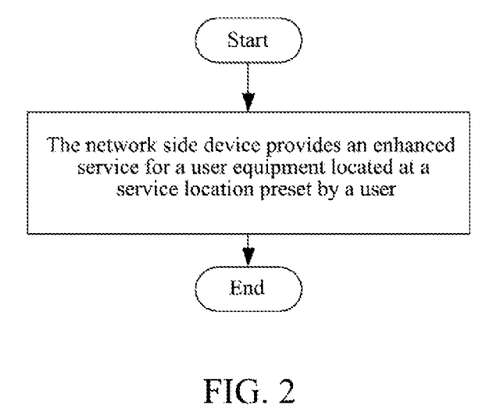
FIG. 2 is a flow chart of a personalized method for enhancing a service.

As shown in FIG. 2, the personalized method for enhancing a service includes: a network side device providing an enhanced service for a user equipment located at a service location preset by a user.

The method for the user to preset the service location can be that the user equipment sends the user indication (that is, the user indication is an indication sent out by the user equipment, received by the network side device and associated with the user identification and/or the user equipment identification, wherein, the user identification includes the international mobile subscriber identity (IMSI) and/or the telephone number MSISDN and/or the temporary user identification, such as, TMSI, GUTI, the user equipment identification includes the international mobile equipment identity (IMEI) or the temporary user equipment identification, such as MME UE S1AP ID, eNB UE S1AP ID, C-RNTI) to the network side device, and the service location required to be preset is carried in the user indication. The user equipment can give the network side device indications through the short messages (SMS), the multimedia message (MMS), the telephone, etc., or, the user is also able to not use the mobile user equipment, for example, to send the user indication to the network side device through the world wide web or other network modes, wherein, the user indication carries the user identification (including the international mobile subscriber identity (IMSI) and/or the telephone number MSISDN and/or the name/identification obtained from the operator by the user, such as, a user name, a card number, a mail address, etc.) and the service location required to be preset, or to send other types of notification messages, wherein, the notification message carries the service location required to be preset. After the network side device receives the user indication carrying the information of the service location, it provides the enhanced service for the user equipment located at the service location.

The service location can also refer to a location where the user equipment is located when sending out the user indication. The operator can obtain the current location of the user through the interface between an application server, a locating service customer end, a GMLC, an MME, and set the personalized location of the user based on that location.

The enhanced service can be preset by the user. The method for the user to preset the enhanced service is similar to the method for presetting the service location, and the user equipment can send the user indication to the network side device, and the user indication carries the service location; or, the user is also able to not use the mobile user equipment, for example, to send the user indication to the network side device through the world wide web or other network modes, wherein, the user indication carries a type of the enhanced service required to be preset; or to send other types of notification messages, wherein, the notification message carries a type of the enhanced service required to be preset. The enhanced service is an enhanced service preset by the user and irrelevant to the service location, alternatively, the enhanced service is an enhanced service preset by the user and corresponding to the preset service location. The user indication carries the enhanced service type corresponding to the user equipment, and the network device provides the enhanced service corresponding to the enhanced service type for the user equipment.

It needs to be illustrated that in the embodiment of the present document, because the user uses the user equipment to access the network, when the user equipment performs the communication with the network side, the location of the user equipment is the location of the user (usually, when performing the communication with the user equipment, the network side can obtain the user identification and the identification of the user equipment which the user is using, and the user identification includes the international mobile subscriber identity (IMSI) and/or the telephone number MSISDN and/or the temporary user identification, such as, TMSI, GUTI, and the user equipment identification includes the international mobile equipment identity (IMEI) or the temporary user equipment identification, such as MME UE S1AP ID, eNB UE S1AP ID, C-RNTI, etc. For example, the network side can obtain the location of the user from the location of the user equipment and the corresponding relation between the user and the user equipment. The communication service provided by the network side for the user is also done through the user equipment (except charging), therefore in the present embodiment, except charging, providing the service for the user is to provide the service for the user equipment, and the meanings of the two are the same (except charging)).

When the network device provides the enhanced service corresponding to the enhanced service type for the user equipment, it can carry the information of the preset service location of the user equipment and the enhanced service type corresponding to the service location in the same user indication at the same time. The user indication carries the information of the service location preset by the user and the enhanced service type preset by the user; the network device provides the enhanced service corresponding to the enhanced service type for the user equipment located at the service location according to the user indication.

The network side device also can take the location where the user equipment is located when sending out the user indication as the service location preset by the user.

The user indication further carries the information of a valid period, and the network side device provides the enhanced service within the valid period.

The user indication includes information used for identifying the service location, comprising at least one of the following information: a serial number, an index, an identification, a type and a name.

The service location is a geographic location; or, the service location is an access point, an access point set, a cell, a cell set, a tracking area and/or a location area which has a corresponding relation with the geographic location; wherein, the access point comprises: a base station, a transmission point, a receiving point, a transmitting antenna and/or a receiving antenna.

The enhanced service includes one or more of the following services: a service for improving a communication rate, a service for enhancing power saving, a service for improving a service quality, a service for expanding a coverage area, a service for reducing an access and/or handover time delay, a service for improving an access and/or handover success rate, a service for reducing overhead, a location-based charging service, and a local business service.

In order to provide the personalized selection ability of the user equipment, the user equipment indicates an option of the service location and/or an option of the enhanced service type through an interface, and the user equipment takes the service location selected by the user as the service location preset by the user and takes the enhanced service type selected by the user as the enhanced service type of the enhanced service. For example, the user equipment indicates an option of the service location through an interface, and the user equipment takes the service location selected by the user as the service location preset by the user.

Through the present scheme, the wireless communication system can provide the enhanced service based on the personalized location of the user, say more accurately, the system provides the enhanced service based on the service location defined by the user; for example, in the service location, the user can have a higher communication rate, be more power saving (the duration time of the battery is longer), have a better quality of service (QoS), better coverage, lower access and handover time delay, higher access and handover success rate, lower overhead, location-based charging (including special pricing package, such as monthly payment), local service, etc. thus the user is enabled to obtain a better quality of experience (QoE).

When the personalized location defined by the user is matched with the current location of the user, the system provides the enhanced service for the user. The location can be a geographic location; or, an access point or an access point set, a cell or a cell set, a tracking area/a location area which has a corresponding relation with the geographic location; wherein, the access point includes: a base station, a transmission point, a receiving point, a transmitting antenna and/or a receiving antenna; the location information includes a coordinate of the geographic location, or an access point identification/a series of access point identifications/an access point set identification, or a cell identification/a series of cell identifications/a cell set identification, or a tracking area identification/a location area identification; if the location includes an access point cell identification or base station identification, then the location information can also include the cell type and the base station type.

The system can provide the enhanced service for the user in combination with the following factors: the type of the UE (such as, an Internet-of-things MTC user equipment, a data card/notebook user equipment, an intellectual mobile phone, a high edition user equipment/a low edition user equipment), a state of the UE (for example, a connection state/an idle state), a service feature of the UE (voice service be dominated, data service being dominated, etc.), a mobility of the UE (high mobility user equipment, low mobility user equipment). But the method close to the user is that the user determines the enhanced service type for the personalized location, for example, low mobility enhancing/high mobility enhancing, data service enhancing/voice service enhancing, connection state enhancing/idle state enhancing, power saving enhancing/QoS enhancing/charging enhancing, MTC user equipment enhancing/data card notebook user equipment enhancing/intellectual mobile phone enhancing/high edition user equipment enhancing/low edition user equipment enhancing. For this reason, the user can indicate the enhanced service type through the UE, the UE can also further indicate to set different enhanced service types for different personalized locations and/or continuous time intervals, or set a same enhanced service type (or default service type) for all personalized locations of that user (all time intervals). When the personalized location of the user is matched with the current location of the user (the condition may also include that the time interval of the personalized location is matched with the current time), the system provides the corresponding service to the user according to the corresponding service type.

The UE can provide the option associated with the enhanced service based on the personalized location (or the agglutinant location service, or the agglutinant location binding) through the interface with the user, and receives the user indication through the interface with the user, and performs the corresponding operation according to the user indication, for example, the UE transmits the signaling to the network side so that the network side provides the enhanced service for the UE in the current location and/or the indicated location (the network side set the current location and/or the indicated location as the personalized location of the user), and the UE can also store it in the form of the configuration information according to the user indication (for example, providing the option for the user and receiving the indication through the interface between the UE and the user, including a display screen, a touch-sensitive screen, a keyboard, pronunciation, etc.), for using next time or long-term using. The UE can also perform intelligence processing according to the user behavior: the UE uses a statistics mechanism to find (within a certain period) one or more locations that influence the user experience most as the candidate location of the enhanced service based on the personalized location; and the statistics include at least one of the followings: the staying time of the user, the service time of the user, the time for providing the particular type of service to the user, the flow of the service of the user, the flow of the particular type of service of the user, the number of times for initiating the user service. For example, the UE counts the service time of the user in each cell (for example, a cell A serves the user for 45 minutes averagely, a cell B serves the user for 30 minutes averagely, a cell C serves the user for 5 minutes averagely, . . . , every day within one month). For another example, the UE counts the continuous service time of the user in each cell (for example, the cell A continuously serves the user for 15 minutes averagely, the cell B continuously serves the user for 10 minutes averagely, and the cell C continuously serves the user for 5 minutes averagely within one month, . . . ). For another example, the UE counts the continuous service time of the user in each cell (for example, the cell A continuously serves the user for 15 minutes averagely, the cell B continuously serves the user for 10 minutes averagely, and the cell C continuously serves the user for 5 minutes averagely within one month, . . . ). For another example, the UE counts, based on the configuration at the network side and/or by itself, the staying time in each cell (including the times in the connection state and the idle state).

Alternatively, after the UE uses the statistic mechanism to obtain a candidate location, before sending the enhanced service (or the agglutinant location service, or the agglutinant location binding) indication based on the personalized location, it needs to be confirmed by the user. For example, the UE displays a location list (such as, the list of commonly-used cells) to the user according to an order of the statistics from high to low through the user interface based on the statistical data, and the user can select some locations from the list of these locations in order to trigger the UE to send the enhanced service indication based on the personalized location. For another example, with the statistical data, the UE can order the location list according to an order of statistics from high to low; when the UE finds that the statistics of the cell where the UE currently stays ranks high (it may represent that the currently located cell is a cell that the user frequently uses), the UE indicates the user whether to perform the enhanced service based on the current location (or whether the agglutinant location service or the agglutinant location binding is required); and if the user confirms, then the UE (in the current location) sends the enhanced service (or the agglutinant location service, or the agglutinant location binding) indication based on the personalized location. For complementing, the statistical data also can be counted by the network side and provided to the UE, or the UE combines the data counted by itself with the data counted by the network side for using.

Embodiment One

The user equipment sends the user indication to the MME through the eNB in the present embodiment.

Figure 3:
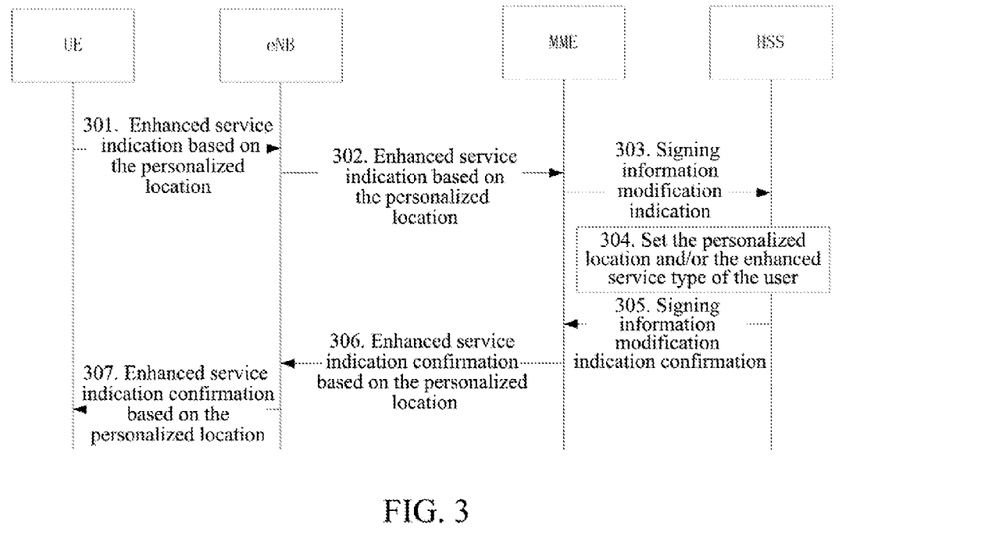
FIG. 3 is a diagram of mode one for a user equipment to notify a user indication to a network side device.

As shown in FIG. 3, after the UE determines the service location and the enhanced service type, the flow chart of sending the user indication to the network side device includes steps 301 to 307.

In step 301, the UE sends the enhanced service indication based on the personalized location to the eNB.

The UE sends the enhanced service (or the agglutinant location service, or the agglutinant location binding) indication based on the personalized location to the current serving base station; the indication can be carried through the existing RRC message (for example, the RRC connection reconfiguration completion message, the measurement report message) or the dedicated RRC message (such as, the enhanced service request message based on the personalized location). The indication information can exclude the detailed location information (such as, the identification of the cell, the identification of the base station, the geographical longitude and latitude/coordinate, and this kind of situation may represent that the UE implicitly indicates that the personalized location required to be bound is the current location, so the air interface overhead can be saved), and also can include one or more detailed location information, that is, the detailed location information used for binding with the enhanced service. The indication information can also include a location range type, and the location range type can include a cell, a base station, a cell+an adjacent cell, a base station+an adjacent base station, a geographic location/coordinate range.

The enhanced service indication based on the personalized location includes the information used for identifying/distinguishing the personalized location, for example: a serial number/an index, an identification, a type (for example: home, office), a name (for example: my home or so-and-so garden, my office or so-and-so company), in this way, it can be convenient for the user to read and manage it, and also convenient for the UE to interact with the network side, for example, confirming, adding, deleting or modifying. The enhanced service indication based on the personalized location also includes the processing that the network side needs to perform on the location: for example, adding, modifying or deleting (wherein, adding can be taken as the default processing mode). The enhanced service indication (or the agglutinant location service indication or the agglutinant location binding indication) based on the personalized location can also include the time indication, in order to indicate an enhanced service based on the personalized location or a valid time duration (such as an hour, one day, one week or one month), and/or a valid time interval (such as, every weekend, workday, from 9:00 to 18:00 every day, from 9:00 to 18:00 on workday, from 20:00 p.m. to 7:00 a.m., etc.) of a certain personalized location. The enhanced service indication based on the personalized location can be an ad hoc/temporary binding, that is, it is valid only when the UE is in the current location and stays in the current location all the time; and it is invalid so long as the UE leaves the current location, or the number of times that the UE leaves the current location cannot exceed a maximum value, and the maximum value can be a default value (for example, default to once), or it is explicitly included in the enhanced service indication based on the personalized location. In order to support not only the ad hoc (single and temporary) binding but also support repeatedly binding or a period or even persistent binding, the enhanced service indication based on the personalized location can also include the binding type.

In step 302, the eNB sends the enhanced service indication based on the personalized location to the MME.

The serving base station sends the enhanced service indication based on the personalized location (or the enhanced service indication based on the personalized location) to the MME through the S1 interface after receiving the UE indication, and the indication can be carried on the S1 interface through the existing S1 message (such as, Initial UE message, Initial Context Setup Response, UE Context Modification Response, Uplink NAS transport message) or the dedicated S1 message (such as, the enhanced service request message based on the personalized location). The enhanced service indication information based on the personalized location transmitted on the S1 interface can include the information sent by the UE to the base station on the air interface, and can also be added with the current location information of the user (such as the serving cell+ adjacent cell identification, serving base station+adjacent base station identification).

In step 303, the MME sends a signing information modification indication to the HSS.

The MME receives the enhanced service indication based on the personalized location (or the agglutinant location service indication or the agglutinant location binding indication) and then verifies its validity (for example, judging whether the user allows to perform the enhanced service of the personalized location according to the authorization information, for another example, whether the location identification is a real and effective location identification); if the verification is passed, the MME sends the signing information modification indication to the HSS, and the HSS sets and stores the personalized location and/or the enhanced service type information based on the indication, and returns a confirmation message to the MME. If the MME verification is failed or the HSS refuses the indication sent by the MME, then the MME sends a refusal indication to the eNB, and the eNB sends the refusal indication to the UE, wherein, it carries the refusal reason (for example, there is no legal authorization, or the location identification is invalid).

In step 304, the HSS sets the personalized location and/or the enhanced service type of the user.

In step 305, the HSS returns the signing information modification indication confirmation to the MME.

In step 306, the MME returns the enhanced service indication confirmation based on the personalized location to the eNB.

The MME returns the enhanced service indication confirmation based on the personalized location (or the agglutinant location service indication confirmation, or the agglutinant location binding indication confirmation) to the serving base station after processing, the confirmation can also include confirmation state of the personalized location indicated by one or more UEs (for example success/failure), wherein, the personalized location indicated by the UE can be represented by the location identification in the above; when the enhanced service setting based on the personalized location confirmed by the MME is different from the indication of the UE, the indication confirmation also includes the modified setting information), the confirmation can be carried through the existing S1 message (such as, Initial Context Setup Response, UE Context Modification Request message) or the dedicated S1 message (such as, the enhanced service response message based on the personalized location, or the agglutinant location service response message, or the agglutinant location binding response message).

In step 307, the eNB returns the enhanced service indication confirmation based on the personalized location to the UE.

After receiving the enhanced service indication confirmation based on the personalized location (or the agglutinant location service indication confirmation, or the agglutinant location binding indication confirmation), the base station can send the enhanced service indication confirmation based on the personalized location to the UE (or the enhanced service indication confirmation based on the personalized location, which can be carried through the RRC message, for example, the RRC Connection Reconfiguration message or the dedicated RRC message, such as, the enhanced service response message based on the personalized location, or the agglutinant location service response message, or the agglutinant location binding response message), and the UE stores/updates the personalized location information after receiving the confirmation, in order to display to the user through the user interface, for example, displaying all/part of the personalized location information so that the user performs subsequent processing, such as, checking, modifying, deleting, etc., and/or prompts the user whether the current location is the set personalized location, so that the user utilizes furthest the enhanced service of the agglutinant location. The UE can also utilize the stored personalized location information to trigger the enhanced service, for example, if the UE judges that the current location is the set personalized location, then it sends a signal or signaling to the network side.

Figure 4:
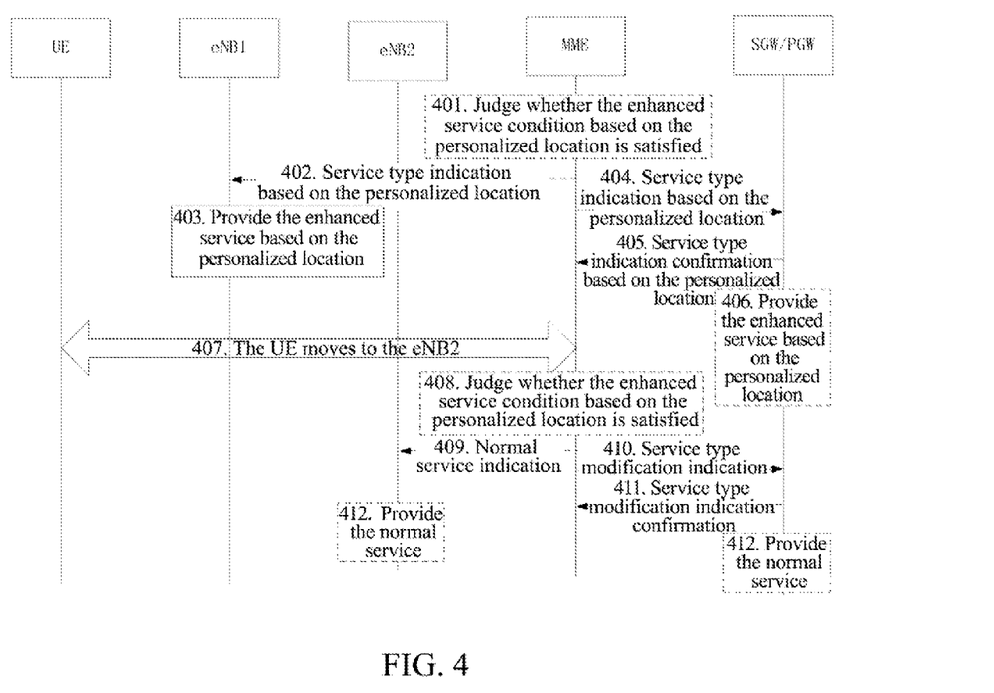
FIG. 4 is a flow chart of an enhanced service based on a set personalized location under mode one.

FIG. 4 is the flow chart of the enhanced service based on the set personalized location, as shown in FIG. 4, including steps 401 to 412.

In step 401, the MME judges whether the enhanced service condition based on the personalized location is satisfied.

In step 402, (if the condition is satisfied), the MME sends the service type indication based on the personalized location to the eNB.

In step 403, the eNB provides the enhanced service based on the personalized location to the user.

In step 404, (if the condition is satisfied), the MME sends the service type indication based on the personalized location to the SGW/PGW.

In step 405, the SGW/PGW returns a service type indication confirmation based on the personalized location to the MME.

In step 406, the SGW/PGW provides the enhanced service based on the personalized location to the user.

In step 407, the UE moves to the eNB2.

In step 408, the MME judges whether the enhanced service condition based on the personalized location is satisfied.

In step 409, (if the condition is not satisfied), the MME sends a normal service indication to the eNB2.

In step 410, (if the condition is not satisfied), the MME sends a service type modification indication to the SGW/PGW.

In step 411, the SGW/PGW returns a service type modification indication confirmation to the MME.

In step 412, the SGW/PGW provides the normal service to the user.

The procedure shown in FIG. 4 is illustrated in detail hereinafter.

The MME can obtain the set personalized location information of the user (may also include the valid time information) and the (corresponding) service type information through the procedure illustrated in FIG. 3, or the MME can obtain the signing information from the HSS through the adhering procedure of the UE, including the set personalized location information and/or time information and/or corresponding service type information. On the other hand, the MME can obtain the current location of the user from the base station and/or the locating server (such as, the E-SMLC or the GMLC) (for example, the MME can know the current serving base station identification, the serving cell identification of the UE, the adjacent base station identification, the adjacent cell identification, the geographic location/coordinate of the serving base station/the serving cell from the serving base station of the UE, and the MME can obtain the geographic location/coordinate of the user from the locating server). Then, the MME judges whether the enhanced service condition based on personalized service is satisfied, and the condition includes: whether the user is authorized, whether the current location of the user is matched with the set personalized location (it is also needed to judge whether the valid time duration is exceeded when there is the valid time information, whether the valid time interval is matched with the current time, or find out the personalized location of the user which is valid in the current time according to the valid time interval to which the current time belongs, and judge whether it is matched with the current location), etc. If the MME judges the condition of the enhanced service is satisfied, then the MME sends the service type indication (or the service configuration indication or the service state indication) based on the personalized location to the current serving base station, wherein, the indicated service type comes from the enhanced service type set previously based on the personalized location (might also include the time interval), in other words, the MME indicates the base station to provide the corresponding service according to the enhanced service type indication indicated by the user. The base station can just begin to provide the enhanced service based on the personalized location to the user after receiving the indication (the process may include a series of processes, such as, the reconfiguration of the RRC connection, the modification of the bearer, the reconfiguration of the measurement, the reconfiguration of the DRX, the reselection and configuration of the access parameter, the reconfiguration of the mobility parameter, to realize the above-mentioned beneficial results, such as, reducing the power consumption of the UE, reducing the overhead, improving the QoS and coverage). The base station can notify the UE that it is in the enhanced service state through the reconfiguration process of the air interface (for example, the reconfiguration process of the RRC connection), or activate the enhanced service based on the personalized location of the UE, so that the base station/the network side and the UE together provide the enhanced service for the user.

After the MME judges that the enhanced service condition is satisfied, (according to the enhanced service type corresponding to the personalized location) the MME sends the enhanced service type or configuration or state indication based on the personalized location to the SGW through the S11 interface, and the SGW sends the enhanced service type or configuration or state indication based on the personalized location to the PGW, and after receiving the confirmation returned by the PGW, returns the enhanced service type based on the personalized location or configuration or state indication confirmation to the MME. Before the PGW returns the confirmation, the PGW perhaps further interacts with the PCRF with respect to the service policy and the charging policy. The messages sent from the MME to the SGW, from the SGW to the PGW, and from the PGW to the PCRF can also include the location information of the UE (such as, the current location information); in this way, the SGW/PGW begins to provide the enhanced service corresponding to the personalized location to the user (for example, providing more higher QoS to the user, and/or providing the location-based charging to the user through the interaction with the PCRF). The sequence of the MME sending the enhanced service indication based on the personalized location to the serving base station and the MME sending the enhanced service indication based on the personalized location to the SGW/PGW can be changed.

Figure 5:
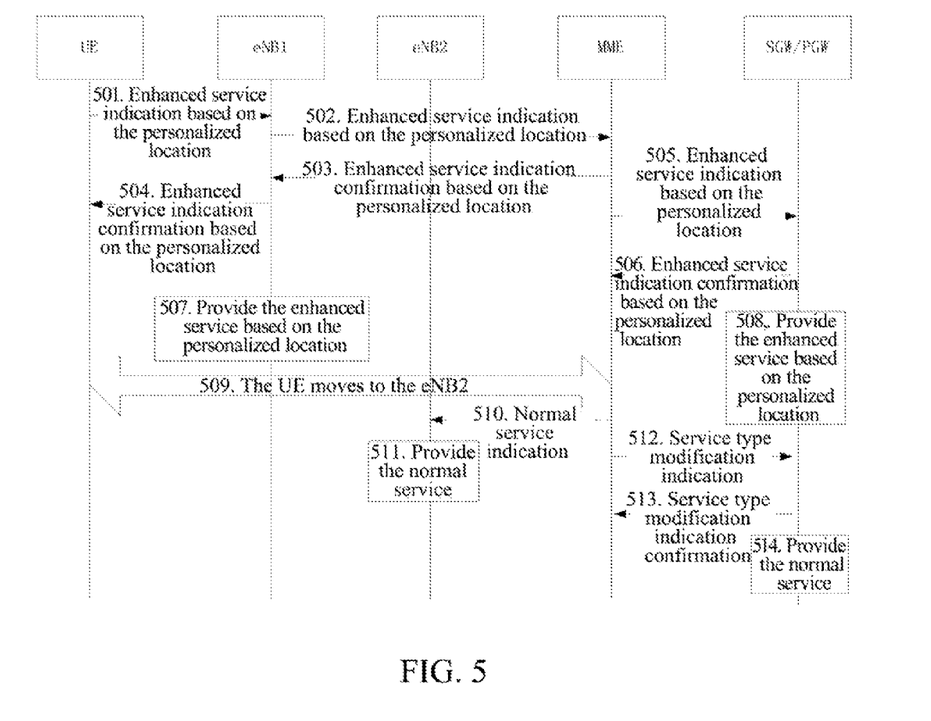
FIG. 5 is a detailed flow chart of an enhanced service based on a temporary personalized location under mode one.

In addition, if the UE initiates the setting of the enhanced service based on the current location according to the procedure in FIG. 3, because of the coinciding of the current location and the personalized location, then the MME might omit the step 401 in FIG. 4 (that is, the MME judges whether the enhanced service condition based on the personalized location is satisfied), and even step 402 (the MME sends the service type indication based on the personalized location to the base station) can be combined with step 306 (the MME sends the enhanced service indication confirmation based on the personalized location to the base station), that is to say, the MME confirms the successful execution of the enhanced service indication based on the personalized location initiated by the UE to the eNB through a message, and indicates to the eNB that the UE is in the enhanced service state based on the personalized location currently or a service type/configuration corresponding to the personalized location. If only aiming at the temporary (and single) personalized enhanced service demand (the temporary agglutinant service demand) of the user at some locations, for example, the user temporarily comes to a certain location (such as the meeting place, business trip location, hotel, friend's home) due to the reasons such as, business trip, traveling, having a meeting, living, etc., and proposes the personalized enhanced service demand, even the modification of the user signing information may not need to be affected, in this way, the interaction procedure between the MME and the HSS and the processing procedure of the HSS can even be omitted (referring to FIG. 5, and it will no longer be described in detail here).

If the UE moves to another location some time later (for example, through the handover or cell reselection), it causes the UE to leave the set personalized location, in this way, the new serving base station/serving cell only provides the normal services to the UE (the new serving base station/serving cell may perform the configuration updating through the handover procedure with the UE, the UE can prompt the user through the user interface after the configuration updating so that the user know that it already leaves the personalized location or no longer enjoys the enhanced service; if the user hopes to continue enjoying the enhanced service or the new location is already configured as one of the locations of the enhanced service in the UE, the UE can send the enhanced service indication based on the personalized location to the network side again, and the subsequent processing procedures will no longer be described in detail); on the other hand, the MME detects that the UE left the set personalized location through the handover procedure or the path switch procedure or the location report procedure etc., or in other words, the MME judges that the user is not satisfied with the enhanced service condition based on the personalized location (for example, through the Handover Notify message, the Path Switch Request message, the Location Report message or the Initial UE Message, the MME finds that the serving cell/the serving base station of the UE changes and the target base station or the new serving cell/serving base station is not matched with the personalized location information set by the MME), then the MME might send the normal service indication to the target base station or the new serving base station (because the normal service is the default configuration usually, the indication step can be skipped or realized through the traditional procedures). In addition, the MME sends the service type (or state or configuration) modification indication to the SGW (for example, through the Modify Bearer Request message), and the SGW returns the service type (or state or configuration) modification indication to the PGW (for example, through the Modify Bearer Request message), and the SGW returns the service type (or state or configuration) modification indication confirmation to the MME after receiving the confirmation returned by the PGW. In the above procedures, the PGW interacts with the PCRF after receiving the message from the SGW, in order to update/modify the service policy/charging policy of the user. The messages sent from the MME to the SGW, from the SGW to the PGW, and from the PGW to the PCRF can also include the location information of the UE (or, the new location information, which can simply indicate whether it is located in the personalized location, and also can provide detailed location information); in this way, after the UE comes to the new location (a location except the personalized location), the system only provides the normal service to the user. In addition, if the personalized location is related to the time (such as, the time duration, the time interval) the enhanced service based on the personalized location of the user is modified (such as, the modification or deletion of the personalized location) through the procedure of FIG. 3, then the MME further needs corresponding processing, for example, triggering the service type/state/configuration modification procedure after timeout, or after the current time interval of the personalized location is exceeded, or after the enhanced service based on the personalized location is reset, the MME reexamines the enhanced service condition based on the personalized location; if the condition is not satisfied, then it triggers the service type/state/configuration modification procedure (for example, indicating the normal service to the current serving base station); or if the condition is satisfied but the service type corresponding to the personalized location changes, then it triggers the service type/state/configuration modification procedure.

Embodiment Two

Figure 6:
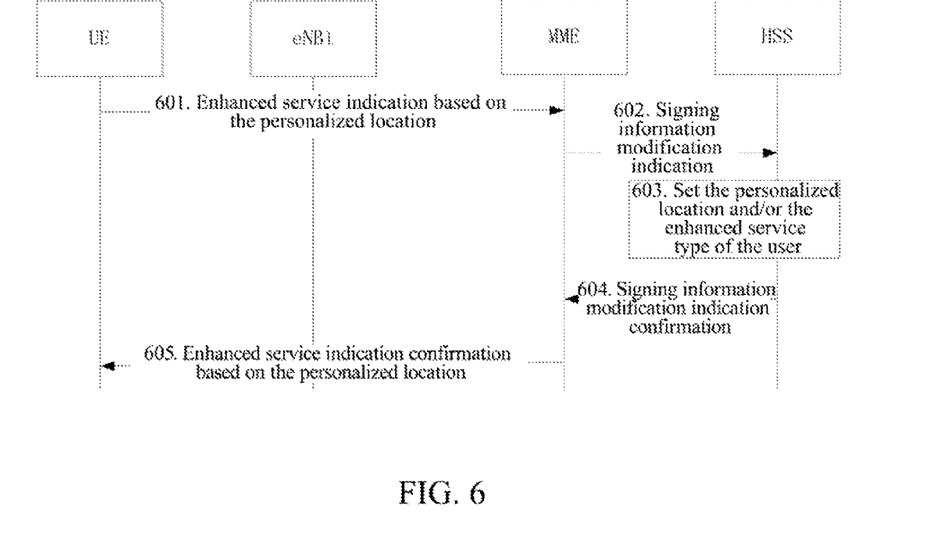
FIG. 6 is a diagram of mode two for a user equipment to notify a user indication to a network side device.
Figure 7:
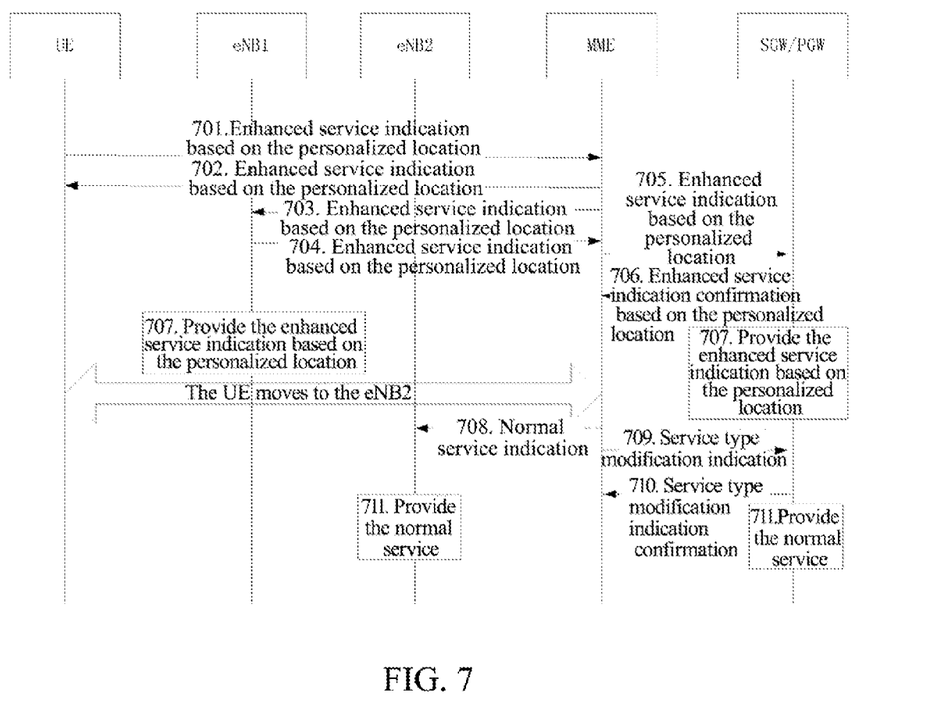
FIG. 7 is a flow chart of an enhanced service based on a temporary personalized location under mode two.

The UE and the network side can adopt the procedure which is different from that in FIG. 3 to set the enhanced service based on the personalized location, for example, replacing the two-section interaction among the three, the UE/the base station/the MME, by the interaction between the UE and the MME, and other aspects (such as, the indication content) are basically unanimous. As shown in FIG. 6, the UE can send the enhanced service indication based on the personalized location to the MME through the NAS message (the NAS message is born via the RRC message of the air interface and forwarded as the bearer of the S1 message on the S1 interface via the base station). The MME/HSS returns the enhanced service indication confirmation based on the personalized location (this is also born via the S1 message through the NAS message and forwarded as the bearer of the RRC message on the air interface via the base station) to the UE after processing, and after receiving the confirmation, the UE can prompt the user through the user interface like the above-mentioned method. Other steps are similar to the procedure illustrated in FIG. 3, and will not be described in detail here. In addition, in this case (that is, a direct interaction between the UE and the MME), the whole procedure only direct at the temporary (and single) personalized enhanced service demand (the temporary agglutinant service demand) at some locations refers to FIG. 7, and will not be described in detail here.

Embodiment Three

Figure 8:
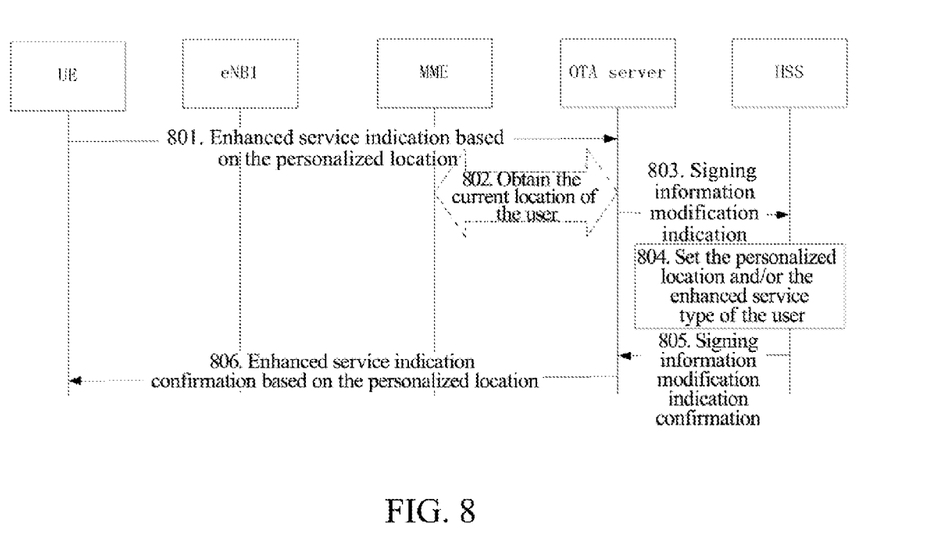
FIG. 8 is a diagram of mode three for a user equipment to notify a user indication to a network side device.

FIG. 8 is the detail flow chart of a setting mode three of the enhanced service based on the personalized location, as shown in FIG. 8, including steps 801 to 806.

In step 801, the UE sends the enhanced service indication based on the personalized location to the OTA server.

In step 802, the OTA server obtains the current location of the UE.

In step 803, the OTA server sends the signing information modification indication to the HSS.

In step 804, the HSS sets the personalized location and/or the service type of the user.

In step 805, the HSS returns the signing information modification indication confirmation to the OTA server.

In step 806, the OTA server returns the enhanced service indication confirmation based on the personalized location to the UE.

The procedure shown in FIG. 8 is illustrated in detail hereinafter.

The interaction procedure illustrated in FIG. 8 is relatively close to the procedure in FIG. 6, and the main difference lies in that the OTA server in FIG. 8 replaces the MME in FIG. 6, as the section interaction node between the UE and the HSS. The associated indication content is basically identical with the indication content in the embodiment of FIG. 6/FIG. 3, and the main difference lies in that the message transmission mode between the UE and the OTA server is different from the message transmission mode between the UE and the MME (the UE interacts with the OTA server through the application layer protocol therebetween); in addition, if the personalized location indicated by UE is the current location, the OTA server obtains the detailed current location information from the UE directly, or obtains the current location information of the UE directly or indirectly from the MME (for the indirect mode, for example, the OTA server obtains the current located location of the user through the interface between the locating service customer end, the GMLC and the MME), and sets the personalized location of the user based on that location. Other aspects are not obvious different from those in FIG. 6, and will not be described in detail here.

Figure 9:
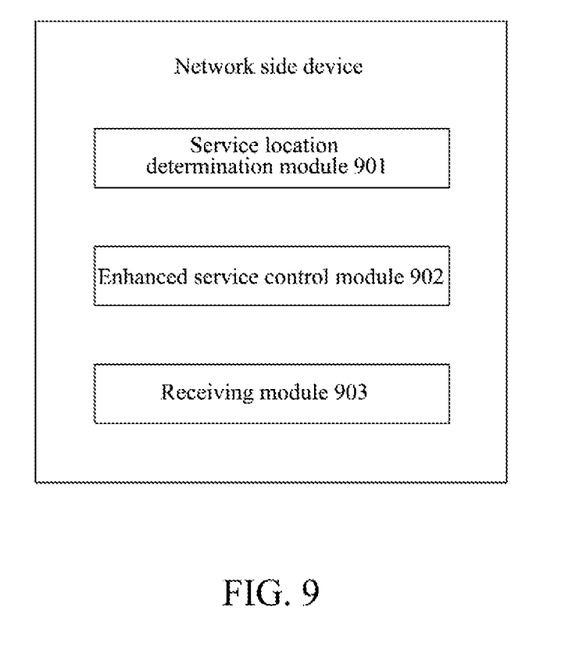
FIG. 9 is a structure diagram of a network side device according to an embodiment of the present document.

Corresponding to the above-mentioned method, the network side device in the present scheme includes a service location determination module 901 and an enhanced service control module 902; wherein, the service location determination module 901 is configured to: maintain a service location preset by a user; and the enhanced service control module 902 is configured to indicate to provide an enhanced service for a user equipment located at a service location preset by a user.

The network side device in the present scheme can be a base station, an SGW or a PGW.

The enhanced service is an enhanced service preset by the user and uncorrelated with the service location, alternatively, the enhanced service is the enhanced service preset by the user and corresponding to the service location.

The network side device further includes a receiving module 903, wherein the receiving module is configured to: receive a user indication; and the enhanced service control module 902 is further configured to: after the receive module 903 receives the user indication, provide the enhanced service to the user equipment located at the service location preset by the user.

The receiving module 903 is further configured to: when the received user indication carries information of the service location of the UE preset by the user, notify the information of the service location to the service location determination module 901; when the received user indication carries an enhanced service type of the user equipment preset by the user, notify the enhanced service type to the enhanced service control module 902;

the service location determination module 901 is further configured to: determine the service location learnt from the receiving module 903 as the service location preset by the user; and the enhanced service control module 902 is further configured to: determine the enhanced service type learnt from the receiving module 903 as a service type of the enhanced service provided for the user equipment.

The enhanced service control module 903 is further configured to: take a location where the user equipment is located when sending out the user indication as the service location.

The receiving module 903 is further configured to: when the received user indication carries the valid time interval, notify the valid time interval to the service location determination module 901; the enhanced service control module 902 is further configured to: provide the enhanced service for the user equipment during the valid time interval learnt from the receiving module 903.

The mobile user equipment in the present scheme include an enhanced service indication module, wherein the enhanced service indication module is configured to: send a user indication to a network side device to enable the network side device to provide an enhanced service for a user equipment located at a service location preset by a user.

The enhanced service indication module is further configured to: send a user indication to the network side device, and carry the service location and/or a type of the enhanced service in the user indication.

The enhanced service indication module is further configured to: send a user indication to the network side device, and carry a valid time interval in the user indication.

The service location is a geographic location; or the service location is an access point, an access point set, a cell, a cell set, a tracking area and/or a location area which has a corresponding relation with the geographic location; wherein, the access point comprises: a base station, a transmission point, a receiving point, a transmitting antenna and/or a receiving antenna.

The enhanced service comprises one or more of the following services: a service for improving a communication rate, a service for enhancing power saving, a service for improving a service quality, a service for expanding a coverage area, a service for reducing an access and/or handover time delay, a service for improving an access and/or handover success rate, a service for reducing overhead, a location-based charging service, and a local business service.

The above-mentioned embodiment mainly explains the present document in the view of the LTE (or LTE-A) system. In real application, the present document can be applied to various mobile cellular communication systems, including the 2G (GSM, CDMA) system, the 3G (UMTS, CDMA-2000, Wimax) system (wherein, the UMTS further includes the WCDMA and the TD-SCDMA), the 4G (LTE/LTE-A, Wimax2.0) system, and even the mobile cellular communication system appeared subsequently. To put it simply, in the GSM system, the network side includes network elements, such as BSC, BTS, SGSN, MSC server, HSS (HLR, AuC), GGSN, PCRF, etc., and the UE can send the user indication to the SGSN or the MSC server (or the CS-MGW), in order to enable the SGSN or the MSC server (or the CS-MGW) to judge whether to provide the enhanced service to the user/UE according to the location information of the user/UE and the location information indicated by the user, and indicate to the BSC, the GGSN and the PCRF; in the UMTS system, the network side includes network elements, such as, RNC, NodeB, SGSN, HSS (HLR, AuC), GGSN, PCRF, etc., and the UE can send the user indication to the SGSN, in order to enable the SGSN to judge whether to provide the enhanced service to the user/UE according to the location of the user/UE (which can be obtained from the RNC) and the location information indicated by the user, and indicate to the RNC, the GGSN and the PCRF; in the Wimax system, the network side includes the base station BS, the ASN-GW and the AAA server, and the mobile terminal MS can send the user indication to the ASN-GW, in order to enable the ASN-GW to judge whether to provide the enhanced service to the MS/user according to the location of the user/MS (the location information of the MS/user can be obtained from the BS) and the location information indicated by the user, and indicate to the BS to provide the enhanced service to the user/MS.

It should be illustrated that, in the case of not conflicting, the embodiments in the present application and features in these embodiments can be combined with each other arbitrarily.

Obviously, the present document can have a variety of other embodiments. Those skilled in the art can make the corresponding modifications and variations according to the present document without departing from the spirit and essence of the present document. And all these modifications or variations should be embodied in the scope of the appended claims of the present document.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in a form of hardware, or in a form of software function module. The present document is not limit to any specific form of the combination of the hardware and software.

INDUSTRIAL APPLICABILITY

The above-mentioned technical scheme can provide a new scheme for the personalized enhanced service, to

What we claim is:

1. A personalized method for enhancing a service, comprising:
    a user equipment sending a user indication to a network side device, the user indication carrying information of a service location preset by a user and an enhanced service type preset by the user;
    the network side device receiving the user indication carrying the information of the service location and the enhanced service type, taking a location where the user equipment is located when sending out the user indication as the service location preset by the user and providing an enhanced service of the enhanced service type preset by the user for the user equipment located at the service location preset by the user;
    wherein the enhanced service provided by the network side device for the user equipment located at the service location preset by the user comprises one or more of the following services:
    a service for improving a communication rate, a service for enhancing power saving, a service for improving Quality of Service (QoS), a service for expanding a coverage area, a service for reducing an access and/or handover time delay, a service for improving an access and/or handover success rate, a service for reducing overhead, and a location-based charging service.

2. The method according to claim 1, wherein:
    the user indication is an indication which is received by the network side device, sent by the user equipment, and associated with a user identification and/or a user equipment identification.

3. The method according to claim 1, wherein:
    the user indication comprises information used for identifying the service location, comprising at least one of the following information: a serial number, an index, an identification, a type and a name.

4. The method according to claim 1, wherein:
    the service location is a geographic location; or,
    the service location is an access point, an access point set, a cell, a cell set, a tracking area and/or a location area which has a corresponding relation with the geographic location;
    wherein, the access point comprises: a base station, a transmission point, a receiving point, a transmitting antenna and/or a receiving antenna.

5. The method according to claim 1, further comprising:
    before the step of the network side device providing an enhanced service for the user equipment located at the service location preset by the user, the user equipment indicating an option of the service location through an interface, and taking a service location selected by the user as the service location preset by the user.

6. A network side device, comprising:
    a processor; and
    a storage device for storing processor-executable instructions that when executed by the processor, cause the processor to perform steps in following modules:
    a receiving module, a service location determination module and an enhanced service control module; wherein,
    the receiving module is configured to: receive a user indication, wherein the user indication is sent by a user equipment to the network side device, and the user indication carries information of a service location preset by a user and an enhanced service type preset by the user; and notify the information of the service location to the service location determination module, and notify the enhanced service type to the enhanced service control module;
    the service location determination module is configured to: determine the service location learnt from the receiving module as the service location preset by the user, and maintain the service location preset by the user; and
    the enhanced service control module is configured to provide an enhanced service of the enhanced service type preset by the user for the user equipment located at the service location preset by the user; and further configured to:
    take a location where the user equipment is located when sending out the user indication as the service location;
    wherein the enhanced service provided by the enhanced service control module for the user equipment located at the service location preset by the user comprises one or more of the following services:
    a service for improving a communication rate, a service for enhancing power saving, a service for improving Quality of Service (QoS), a service for expanding a coverage area, a service for reducing an access and/or handover time delay, a service for improving an access and/or handover success rate, a service for reducing overhead, and a location-based charging service.

7. A mobile user equipment, comprising:
    a processor; and
    a storage device for storing processor-executable instructions that when executed by the processor, cause the processor to perform steps in the following module:
    an enhanced service indication module, wherein:
    the enhanced service indication module is configured to: send a user indication to a network side device, the user indication carrying information of a service location preset by a user and an enhanced service type preset by the user, to enable the network side device to take a location where the user equipment is located when sending out the user indication as the service location and provide an enhanced service of the enhanced service type preset by the user for the user equipment located at the service location preset by the user;
    wherein the enhanced service provided by the network side device for the user equipment located at the service location preset by the user comprises one or more of the following services:
    a service for improving a communication rate, a service for enhancing power saving, a service for improving Quality of Service (QoS), a service for expanding a coverage area, a service for reducing an access and/or handover time delay, a service for improving an access and/or handover success rate, a service for reducing overhead, and a location-based charging service.

8. The mobile user equipment according to claim 7, wherein:
    the service location is a geographic location; or,
    the service location is an access point, an access point set, a cell, a cell set, a tracking area and/or a location area which has a corresponding relation with the geographic location;
    wherein, the access point comprises: a base station, a transmission point, a receiving point, a transmitting antenna and/or a receiving antenna.

* * * * *